United States Patent Office 3,737,483
Patented June 5, 1973

3,737,483
GRAFT COPOLYMERIZATION OF MALEIC ANHYDRIDE AND AN ALPHA OLEFIN ONTO AN ETHYLENE-VINYL ACETATE COPOLYMER
Yujiro Kosaka, Masaru Uemura, Mitsutaka Saito, Yuji Suzuki, and Kunio Takamoto, Yamaguchi-ken, Japan, assignors to Toyo Soda Manufacturing Co., Ltd., Tokyo, Japan
No Drawing. Filed June 11, 1971, Ser. No. 152,367
Claims priority, application Japan, June 26, 1970, 45/55,787; Sept. 9, 1970, 45/79,067
Int. Cl. C08f 15/00
U.S. Cl. 260—878 R
10 Claims

ABSTRACT OF THE DISCLOSURE

A carboxylated polymer product is produced by polymerizing 1–50 parts by weight of a monomeric mixture of maleic anhydride and an α-olefin in contact with 50–99 parts by weight of an ethylene vinyl acetate copolymer having a vinyl acetate content of at least 3%, using a free radical polymerization initiator.

BACKGROUND OF THE INVENTION

Field of the invention

This invention relates to a novel carboxylated polymer which is useful as a base for the preparation of molding compounds, paints, and adhesives, and more particularly to a method of producing a carboxylated polymer by polymerizing maleic anhydride and an α-olefin in the presence of an ethylene-vinyl acetate copolymer.

Description of prior art

It has been known to form alternate copolymers of maleic anhydride and an α-olefin, such as propylene, butene-1, hexene-1, decene-1, and 4-methyl octene-1, etc. by the use of a free radical polymerization initiator. These polymers are so brittle, however, that they are generally unfit for use as molding materials, and hence their use is limited to the preparation of adhesives and the preparation of dispersing agents, in which the acid anhydride polarity and the high reactivity of these copolymers are required.

It would be desirable to provide a maleic anhydride-α-olefin copolymer which retains the desirable acid anhydride polarity and high reactivity, yet which has a significantly wider application than the prior art copolymers.

SUMMARY OF THE INVENTION

Accordingly, it is one object of the present invention to provide a copolymer characterized by acid anhydride polarity and high reactivity which can be used as a base in the preparation of molding compounds, paints and adhesives.

A further object of this invention is to provide a graft polymerization method for providing said copolymer.

These and other objects have now herein been attained by alternate copolymerization of maleic anhydride and an α-olefin in the presence of an ethylene-vinyl acetate copolymer whereby the maleic anhydride-α-olefin is grafted onto said ethylene-vinyl acetate copolymer. The product of the graft polymerization reaction has been found to possess similar polarity and high reactivity as maleic anhydride-α-olefin alternate copolymers, but superior physical properties as compared with ethylene-vinyl acetate copolymer.

DETAILED DESCRIPTION OF PREFERRED EMBODIMENTS

According to the present invention, maleic anhydride and an α-olefin are copolymerized in the presence of an ethylene-vinyl acetate copolymer, using a free radical polymerization initiator, to effect grafting of the maleic anhydride and the α-olefin onto the ethylene-vinyl acetate copolymer. The product of this reaction is an alternate copolymer of maleic anhydride-α-olefin grafted onto ethylene-vinyl acetate copolymer, in combination with an alternate copolymer of maleic anhydride and an α-olefin. The product of this invention was found to be superior in mechanical properties and thermostability as compared with ethylene-vinyl acetate copolymer alone, and also has been found to be superior to most other ethylene copolymers. In addition, the product of this invention possesses superior adhesiveness, oil resistance and anti-static properties and may be used as a reaction base for ion cross-linkable polymers.

The reaction of the present invention may be conveniently carried out by dissolving, swelling or dispersing a given amount of the ethylene-vinyl acetate copolymer with the maleic anhydride and α-olefin. Polymerization is then effected with a free-radical polymerization initiator.

The higher the quantity of the ethylene-vinyl acetate copolymer substrate in the reaction system, the higher will be the graft efficiency. Good results are obtainable when the ethylene-vinyl acetate copolymer is present in amounts of greater than 3% by weight, and more preferably in amounts of between 10% and 50% by weight.

There is no limitation as to the molecular weight of the ethylene-vinyl acetate copolymer, but it is desired that the molecular weight be such that the copolymer possesses good melt flow properties. When superior mechanical properties are desired, it is best to use a high melt index ethylene-vinyl acetate copolymer. A low melt index ethylene-vinyl acetate copolymer can also be used, however, with good results, depending upon the desired end use.

The maleic anhydride and α-olefin should be used in weight ratios of 1–50 parts by weight of a monomeric mixture of maleic anhydride and α-olefin to 50–99 parts by weight ethylene-vinyl acetate copolymer. The maleic anhydride and α-olefin may be used in equimolar amounts, although more or less α-olefin is not necessarily objectionable. When the α-olefin is used as a solvent for the system, it may be used in much larger amounts without limitation.

Suitable α-olefins include those α-olefins having up to 10 Carbon atoms. For instance, good results are obtainable with such α-olefins as ethylene, propylene, butene-1, pentene-1, hexene-1, 4-methyl pentene-1, 3-methyl butene-1, octene-1 and decene-1.

Suitable solvents which may be used in carrying out the process of this invention include aromatic hydrocarbons such as benzene and toluene, and aliphatic hydrocarbons, such as propane, butane, hexane, isooctane and kerosene.

A free radical polymerization initiator may be used for the copolymerization of maleic anhydride and α-olefin in the presence of the ethylene-vinyl acetate copolymer, although it is dependent upon the polymerization temperature selected. Suitable initiators include such organic peroxides as the dialkyl, diacyl and peroxyester peroxides including dicumylperoxide, di-tert-butyl peroxide, tert-butyl-per-benzoate, tert-butyl-per-isobutylate, benzol peroxide, tert-butyl-peracetate, acetylperoxide and tert-butyl perpivalate, etc., are suitable. These free radical polymerization initiators may be used in the range of 0.1 to 5% by weight based on the weight of monomers and maleic anhydride to be polymerized.

The polymerization is carried out in the range of from room temperature to 120° C., i.e., the usual copolymerization temperature for maleic anhydride and an α-olefin, which is from about 20° C. to 120° C.

When the product obtained by the present invention was compared with an ungrafted ethylene-vinyl acetate copolymer, it was found that when containing approximately 20% maleic anhydride, it had a tensile strength of about twice that of the ethylene-vinyl acetate copolymer. Moreover, the polymer obtained by the present invention has a higher softening temperature, which means that it is characterized by good heat resistance.

The product of the present invention can be molded or formed into a sheet or film by using the same conventional molding techniques as are used for ordinary polyethylene and these sheets, films or moldings have been found to have superior adhesiveness and other superior properties, such as superior printability and superior antistatic properties as compared with currently available ethylene copolymers. These polymers also can be used as a reaction base for ion cross-linkable polymers and further, they can be used to provide improved reinforcement for other polymers due to their high interfacial adhesiveness. They may also be used as fillers, etc.

Having generally described the invention, a further explanation will be obtained by reference to certain specific examples which are provided herein for purposes of illustration only and are not intended to be limiting in any manner. Unless otherwise indicated, all "percents" and "parts" are by weight.

EXAMPLE 1

300 gms. of ethylene-vinyl acetate copolymer (vinyl acetate content 30%, MI 24 g./10 min.), 60 gms. of maleic anhydride, 40 gms. of propylene and 1 kg. of benzene were placed in an autoclave of 2 litres capacity equipped with a stirrer. The reactants were dissolved by stirring at 85° C. for 1 hour, after which the temperature was lowered to 75° C. and 3 mls. of 25% acetyl peroxide dimethylphthalate solution was injected into the mixture. Polymerization was carried out at 75° C. for 6 hours. When the polymerization was complete, the product was poured into about 2 litres of methanol, and the polymer was removed as a precipitate. The precipitate was removed by filtration and dried under reduced pressure. 368 gms. of the polymer were obtained in this manner. The polymer contained 13% maleic anhydride and 6% propylene.

This polymer was roll mixed and press molded into a 2 mm. thick sheet for test purposes. When the physical properties of the polymer were measured in the same manner as polyethylene, the following results were obtained. The physical properties were compared with the ethylene-vinyl acetate copolymer which had been used as the reactant for reference.

|  | Polymer obtained in Ex. 1 | Ethylene-vinyl acetate copolymer used as initial reactant |
| --- | --- | --- |
| Tensile strength (ASTM D638-68T), kg./cm.² | 184 | 75 |
| Elongation (ASTM D638-68T), kg./cm.² | 700 | 860 |
| Torsional stiffness (ASTM D1043-69T), kg./cm.² | 122 | 34 |
| Vicat softening point (ASTM D1525-65T), ° C. | 46 | 37 |

The above figures also show that the new polymer of this invention has superior qualities as a plastics material.

EXAMPLE 2

300 gms. of ethylene-vinyl acetate copolymer (vinyl acetate content 15%, MI 1.5 g./10 min.), 60 gms. of maleic anhydride, 40 gms. of propylene, and 1 kg. of benzene and 3 mls. of 25% acetylperoxide solution were polymerized at 75° C. for 6 hours in a similar manner as in Example 1. 380 gms. of polymer was obtained which had the following physical properties:

|  | Polymer obtained in Ex. 2 | Ethylene-vinyl acetate copolymer used as initial reactant |
| --- | --- | --- |
| Tensile strength (ASTM D638-68T), kg./cm.² | 246 | 165 |
| Elongation (ASTM D638-68T), percent | 525 | 735 |
| Torsional stiffness (ASTM D1043-69T), kg./cm.² | 357 | 175 |
| Vicat softening point (ASTM D1525-65T), ° C. | 75 | 70 |

EXAMPLE 3

150 gms. of ethylene-vinyl acetate copolymer (vinyl acetate content 25%, MI* 3.5/10 min.), 150 gms. of maleic anhydride, 90 gms. of propylene, 1 kg. of benzene and 1.5 gms. of benzoylperoxide were polymerized in a similar manner as in Example 1 at a polymerization temperature of 90° C. for 5 hours. 320 gms. of polymer was obtained having the following physical properties:

|  | Polymer obtained in Ex. 3 | Ethylene-vinyl acetate copolymer used as initial reactant |
| --- | --- | --- |
| Tensile strength (ASTM D638-68T), kg./cm.² | 260 | 165 |
| Elongation (ASTM D638-68T), percent | 50 | 815 |
| Torsional stiffness (ASTM D1043-69T), kg./cm.² | 276 | 70 |
| Vicat softening point (ASTM D1525-65T), ° C. | 62 | 51 |

EXAMPLE 4

200 gms. of ethylene-vinyl acetate copolymer (vinyl acetate content 25% MI* 3.5 g./10 min.), 60 gms. of maleic anhydride and 1 kg. of benzene were placed in an autoclave of 2 litres capacity equipped with a stirrer. The reactants were dissolved by stirring at 85° C. for 1 hour, and the temperature was lowered to 75° C. Ethylene was charged to the mixture from an ethylene storage tank, so as to maintain the pressure of the reaction system at 50 kg./cm.². 3 mls. of 25% acetylperoxide dimethylphthalate solution was injected into the mixture. Polymerization was conducted at 75° C. for 6 hours. When polymerization was complete, the product was poured into about 2 litres of methanol, and the polymer was removed as a precipitate. The precipitate was recovered by filtration and was dried under a reduced pressure. 292 gms. of polymer were obtained in this manner. The polymer contained 22% of maleic anhydride and 10% of ethylene. Its physical properties were as follows:

|  | Polymer obtained in Ex. 4 | Ethylene-vinyl acetate copolymer used as initial reactant |
| --- | --- | --- |
| Tensile strength (ASTM D638-68T), kg./cm.² | 310 | 165 |
| Elongation (ASTM D638-68T), percent | 515 | 815 |
| Torsional stiffness (ASTM D1043-69T), kg./cm.² | 131 | 70 |
| Vicat softening point (ASTM D1525-65T), ° C. | 60 | 51 |

EXAMPLE 5

200 gms. of ethylene-vinyl acetate copolymer (vinyl acetate content 25%, MI* 3.5 g./10 min.), 70 gms. of maleic anhydride, 1 kg. of benzene and ethylene and 1 gm. of benzoylperoxide were polymerized at 90° C. for 6 hours in a similar manner as in Example 4. 296 gms.

*According to D1238-65T of A.S.T.M.

of polymer was obtained which had the following physical properties:

| | Polymer obtained in Ex. 5 | Ethylene-vinyl acetate copolymer used as initial reactant |
|---|---|---|
| Tensile strength (ASTM D638-68T), kg./cm.² | 281 | 165 |
| Elongation (ASTM D638-68T), percent | 510 | 815 |
| Torsional stiffness (ASTM D1043-69T), kg./cm.² | 148 | 70 |
| Vicat softening point (ASTM D1525-65T), °C | 60 | 51 |

EXAMPLE 6

300 gms. of ethylene-vinyl acetate copolymer (vinyl acetate contents 15%, MI 1.5 g./10 min.), 60 gms. of maleic anhydride, 50 gms. of butene-1, 1 kg. of benzene and 3 mls. of 25% acetylperoxide dimethylphthalate solution were polymerized at 75° C. for 6 hours in a similar manner as in Example 1. 331 gms. of polymer was obtained in this manner. The polymer contained 7% of maleic anhydride and 3% of butene-1.

Its physical properties were as follows:

| | Polymer obtained in Ex. 6 | Ethylene-vinyl acetate copolymer used as initial reactant |
|---|---|---|
| Tensile strength (ASTM D638-68T), kg./cm.² | 243 | 165 |
| Elongation (ASTM D638-68%), percent | 745 | 735 |
| Torsional stiffness (ASTM D1043-69T), kg./cm.² | 201 | 175 |
| Vicat softening point (ASTM D1525-65T), °C | 74 | 70 |

Having now fully described the invention, it will be apparent to one of ordinary skill in the art that many changes and modifications can be made thereto without departing from the spirit or scope thereof. Accordingly, what is claimed as new and desired to be secured by Letters Patent of the United States is:

1. A carboxylated polymer product which comprises:
    (a) 1-50 parts by weight of a mixture of maleic anhydride and an α-olefin having been polymerized in contact with
    (b) 50-99 parts by weight of an ethylene-vinyl acetate copolymer containing at least 3% by weight vinyl acetate at a temperature of from 20°-120° C. in the presence of an organic peroxide free radical polymerization initiator and an aromatic or aliphatic hydrocarbon diluent.

2. The product of claim 1, wherein said α-olefin is selected from the group consisting of ethylene, propylene, butene-1, pentene-1, hexene-1, 4-methyl pentene-1, 3-methylbutene-1, octene-1, and decene-1.

3. The product of claim 1, wherein said ethylene-vinyl acetate copolymer has a vinyl acetate content of 3-50 percent by weight.

4. The product of claim 1, wherein said maleic anhydride and said α-olefin are in equimolar amounts.

5. A process for producing a carboxylated polymer product which comprises:
    polymerizing 1-50 parts by weight of a mixture of maleic anhydride and an α-olefin in contact with 50-99 parts by weight of an ethylene-vinyl acetate copolymer containing at least 3% vinyl acetate at a temperature of from 20-120° C. in the presence of an organic peroxide free radical polymerization initiator and an aromatic or aliphatic hydrocarbon diluent.

6. The process of claim 5, wherein polymerization is effected at a temperature of from 20°-120° C.

7. The process of claim 5, wherein said free radical polymerization initiator is selected from the group consisting of dialkyl peroxide, diacyl peroxide and peroxyester.

8. The process of claim 7, wherein said initiator is used in amounts of from 0.1 to 5% by weight, based on the weight of maleic anhydride-α-olefin mixture.

9. The process of claim 5, wherein said polymerization is effected in solution using a solvent selected from the group consisting of aromatic and aliphatic hydrocarbons.

10. The process of claim 5, wherein said maleic anhydride and said α-olefin are present in the reaction mixture in equimolar amounts.

References Cited

FOREIGN PATENTS

| 946,384 | 1/1964 | Great Britain | 260—878 R |
| 24,265 | 10/1964 | Japan | 260—878 R |

JOSEPH L. SCHOFER, Primary Examiner

A. HOLLER, Assistant Examiner